United States Patent [19]

Enomoto

[11] Patent Number: 4,658,937

[45] Date of Patent: Apr. 21, 1987

[54] BRAKE UNIT OF POWER TRAIN OUTPUT

[75] Inventor: Hirokazu Enomoto, Aichi, Japan

[73] Assignee: Fuji Tekko Co., Ltd., Kosai, Japan

[21] Appl. No.: 741,237

[22] Filed: Jun. 4, 1985

[30] Foreign Application Priority Data

Sep. 17, 1984 [JP] Japan .................. 59-194265

[51] Int. Cl.[4] .................... F16D 55/224; F16D 55/40
[52] U.S. Cl. ................... 188/71.4; 188/71.5;
 188/72.3; 188/73.45; 188/216
[58] Field of Search .............. 188/71.5, 72.3, 216,
 188/72.4, 366, 367, 73.44, 73.45, 71.4;
 192/70.28, 89 B, 85 C, 85 CA

[56] References Cited

U.S. PATENT DOCUMENTS

| | | | |
|---|---|---|---|
| 2,551,253 | 5/1951 | Du Bois | 188/71.5 |
| 2,914,140 | 11/1959 | Werner | 188/71.5 |
| 2,954,850 | 10/1960 | Cislo | 188/71.5 |
| 3,727,711 | 4/1973 | Sebern | 188/71.5 |
| 4,090,414 | 5/1978 | White | 74/733 |
| 4,223,764 | 9/1980 | Flotow | 188/72.3 |
| 4,358,000 | 11/1982 | Cumming | 188/71.5 |

Primary Examiner—George E. A. Halvosa
Assistant Examiner—Richard R. Diefendorf
Attorney, Agent, or Firm—Wenderoth, Lind & Ponack

[57] ABSTRACT

The rotating brake plates and the fixed brake plates of a power train brake are pressed by way of the movement of the brake piston due to the supply of hydraulic pressure, thereby braking the output shaft. The guide rod is cantilever supported in the housing. The guide rod is inserted into a hole in the projecting portion at the outer periphery of the piston. The return spring is interposed between the flange portion at the end of the rod and the piston. When the hydraulic pressure is released, the brake piston is returned by the force of the return spring.

1 Claim, 1 Drawing Figure

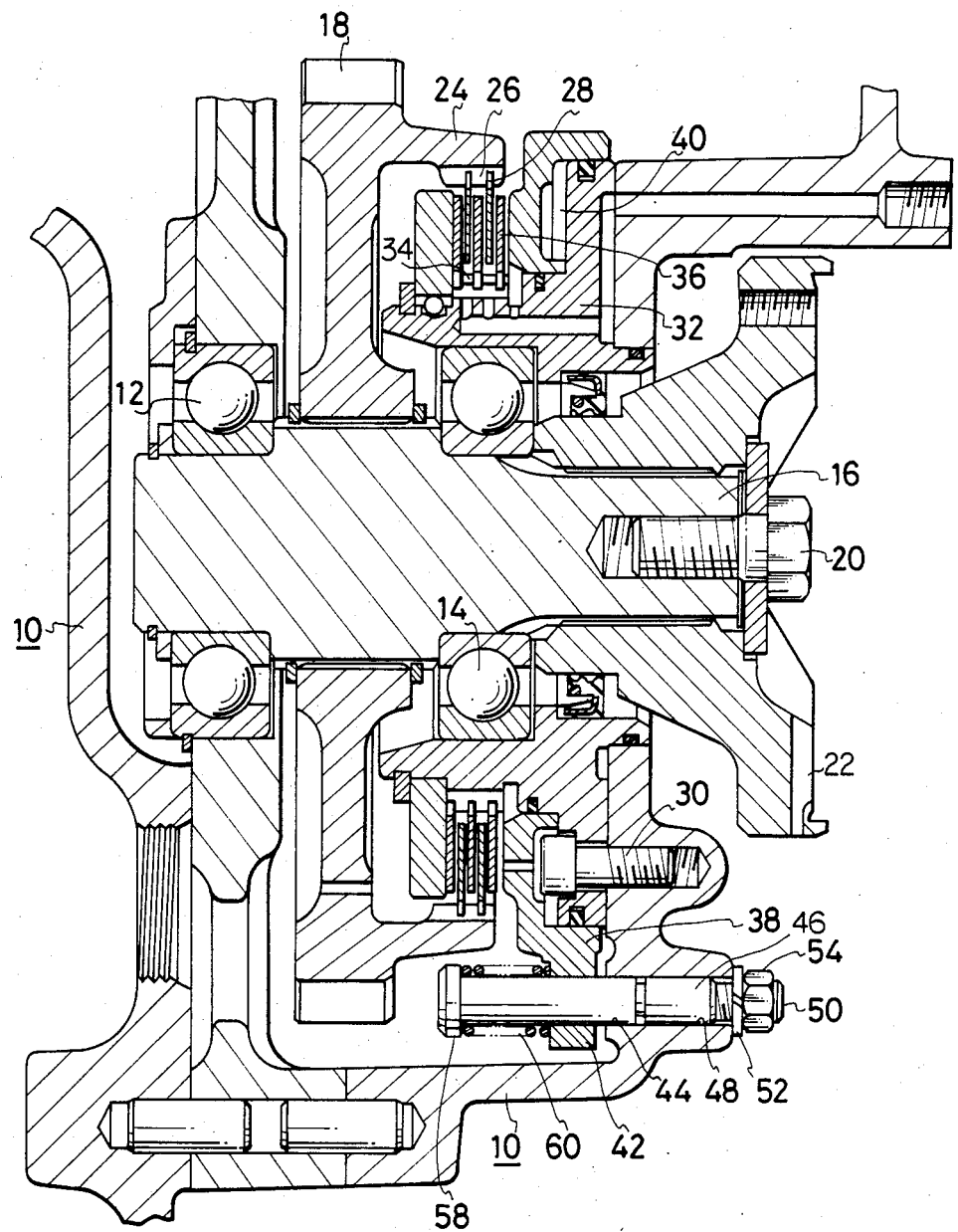

BRAKE UNIT OF POWER TRAIN OUTPUT

BACKGROUND OF THE INVENTION

The present invention relates to a power train output which is used to take out the power from an automatic transmission of a tractor or the like to an attached apparatus or other apparatus and, more particularly, to a brake unit to stop the rotation of the output shaft of the power train output upon the supply of a brake hydraulic operating pressure.

Hitherto, in automatic transmissions of a tractor or the like, a power train output which is directly coupled to a power output shaft from the engine and which serves to take out the power to an attached apparatus or other apparatus is provided, and a brake unit to stop the rotation of the output shaft due to the hydraulic pressure is built into the power train output.

Such a brake unit has a structure such that brake plates are alternately arranged between the spline hub of a brake drum fixed to the output shaft and the spline hub on the fixed side, and the rotation side and the fixed side of the brake plates are brought into contact by means of the pressure of the brake piston due to the supply of the hydraulic pressure and thereby causing braking.

On the other hand, the brake piston which is made operative by way of the hydraulic pressure is ordinarily mechanically returned by use of a return spring. Practically speaking, the return spring is assembled between the brake piston and a fixed part of the housing or the like. The return spring is compressed due to the movement of the brake piston due to the hydraulic pressure. Then, upon release of the hydraulic pressure, the brake piston is pushed and returned to the brake release position by means of the force of the return spring.

However, in such a conventional return structure of the brake piston, the space needed to accommodate the return spring has to be provided between the brake piston and the housing serving as the fixed side. Thus, there are problems such that the structure of the brake unit becomes complicated and also the brake unit is increased in size to provide enough space for the return spring.

SUMMARY OF THE INVENTION

The present invention is made in consideration of the foregoing problems in the conventional technology and seeks to simplify the return means for the brake piston and thereby to reduce the size of the brake unit.

Another object of the invention is to enable the spring load of the return spring to be controlled from the outside even after assembly.

The above and other objects, features and advantages of the present invention will be more apparent from the following detailed description in conjunction with the accompanying drawings.

BRIEF DESCRIPTION OF THE DRAWING

The sole FIGURE is a cross sectional view showing one embodiment of the present invention.

DETAILED DESCRIPTION OF THE PREFERRED EMBODIMENT

Referring now to the drawing, reference numeral 10 denotes a casing of a power train output which is provided in an automatic transmission of a tractor or the like. An output shaft 16 is rotatably mounted in the casing 10 in bearings 12 and 14. An output gear 18 is fixed to the output shaft 16 by spline engagement. Other gears (not shown) are adapted to be come into engagement with the output gear 18, thereby transmitting to the output shaft 16 the rotation of the first shaft in the automatic transmission, namely, the rotation of the input shaft which has received the power from the engine to be directly transmitted. Therefore, the output shaft 16 always receives the power from the engine irrespective of the selected state of the automatic transmission. An output flange 22 is fixed to the end of the output shaft 16 by means of a bolt 20. The power can be taken out to the outside by coupling an attached apparatus or other apparatus to the output flange 22.

A brake drum 24 is integrally formed on the right side of the output gear 18. Two rotating brake plates 28 are arranged in a spline hub 26 formed on the inner peripheral surface of the brake drum 24.

A fixed brake housing 32 fixed to the casing 10 by a bolt 30 is provided inside of the brake drum 24. A spline hub 34 is formed on the outer peripheral surface of the fixed brake housing 32 which faces the spline hub 26 of the brake drum 24. Three fixed brake plates 36 are arranged in the spline hub 34 in such a manner that they are alternately located with regard to the rotating brake plates 28.

A brake piston 38 is slidably mounted with respect to the fixed brake housing 32 on the right side of the fixed brake plates 36 and rotating brake plates 28 which are alternately arranged.

A piston fluid chamber 40 adapted to receive the supply of a hydraulic brake operating pressure fluid from the outside is formed between the brake piston 38 and the brake housing 32.

As shown on the lower side of the piston in the drawing, a projecting portion 42 is formed at three positions around the outer periphery of the brake piston 38. A guide rod 46 fixed to the housing 10 is inserted into a through hole 44 formed in the projecting portion 42. A flange portion 58 is formed at the left end of the guide rod 46 and a return spring 60 is interposed between the brake piston 38 and the flange portion 58. In addition, a threaded portion 50 is inserted into an attaching hole 48 formed in the casing 10. A nut 54 is screwed against a washer 52 on the threaded portion 50 which is exposed to the outside, thereby supporting the guide rod 46 in cantilever fashion. In this way, the return mechanism of the brake piston 38 is constituted.

Next, the braking operation of the foregoing embodiment will be explained.

First, in the inoperative state of the brake, the hydraulic pressure in the piston fluid chamber 40 is zero and as shown in the diagram, the brake piston 38 is in the state such that the frictional contact among the rotating brake plates 28 and the fixed brake plates 36 is released by way of the force of the return spring 60 positioned between the projecting portion 42 of the brake piston 38 and the flange portion 58 of the guide rod 46 which is supported on the casing 10.

When brake hydraulic pressure is supplied from the outside to the piston fluid chamber 40 of the brake piston 38, the return spring 60 is compressed and moved to the left by the brake piston 38 due to the brake hydraulic pressure supplied, so that the fixed brake plates 36 are pushed against the rotating brake plates 28. Thus, the output shaft 16 can be braked through the output gear 18 by way of the resistance due to the frictional contact of those plates.

It will be obviously understood that by releasing the brake hydraulic pressure in the piston fluid chamber 40, the brake piston 38 is returned to the brake release position by the force of the compressed return spring 60.

An explanation will be given with regard to the point that the structure of the brake unit can be simplified and made smaller by way of the foregoing embodiment.

In the return structure in a conventional brake unit, it is necessary to assemble the return spring between the inner peripheral portion of the brake piston and the fixed side thereof. Therefore, it is necessary to enlarge the diameter of the brake piston 38 thereby to assure a sufficiently large assembly space for the spring inside of the brake piston. However, according to the invention, the projecting portion 42 is formed outside of the brake piston 38 and the guide rod 46 supported on the casing 10 is inserted into the through hole 44 in the projecting portion 42. The return spring 60 is assembled between the flange portion 58 of the guide rod 46 and the projecting portion 42. Consequently, the return spring 60 can be arranged in the outer peripheral portion of the brake piston 38 where there is a relatively large space.

This results in that the diameter of the brake piston 38 can be made small and the fixed brake plates 36 and rotating brake plates 28 and further the brake drum 24 itself formed integrally with the output gear 18 can be also made small in size.

Moreover, according to the invention, the spring load of the return spring 60 can be freely controlled from the outside.

Practically speaking, in the conventional return spring, the spring load is unconditionally determined on the basis of the assembly dimensions of the return spring. However, in this invention, the guide rod 46 can be forwardly or backwardly moved by adjusting the nut 54 by which the guide rod 46 is fixed to the casing 10, thereby making it possible to change the distance between the projecting portion 42 of the brake piston 38 and the flange portion 58 of the guide rod 46. In this way, the strength of the return spring 60 can be controlled to the proper value after the assembly due to the adjustment of the distance mentioned above.

Although the foregoing embodiment has been described with respect to an example of the brake unit of the power train output, the invention is not limited to this. For instance, the return structure of the present invention in which the spring is cantilever supported and attached can be also applied to any other proper brake units having a brake piston.

What is claimed is:

1. A brake unit for a power take-off unit having a fixed portion and a rotating shaft, said brake unit comprising:
   a brake drum having a rotating spline hub thereon and a plurality of rotating brake plates mounted on said spline hub for sliding movement therealong;
   a fixed spline hub on said fixed portion and a plurality of brake plates mounted on said fixed spline hub for sliding movement therealong and interleaved with said rotating brake plates;
   a brake piston having means for receiving a supply of hydraulic pressure from a pressure source outside of said brake unit and mounted on said unit for movement thereon for pressing said brake plates along said spline hubs against each other, and said brake piston having projecting portions on the outer periphery thereof having through holes therein parallel to the movement of said piston;
   said fixed portion having a plurality of mounting holes therein aligned with said holes in said projecting portions;
   a plurality of rod members each having a free end and positioned in said mounting holes and extending in cantilever fashion through said through holes in said projecting portions, and each having a flange on the free end thereof;
   a return spring around each rod member between the flange thereon and the projecting portion;
   each said rod member having a threaded portion on an end extending through said fixed portion and exposed on the outside of the corresponding mounting hole on the opposite side of said mounting hole from the location of said flange; and
   a nut threaded on said threaded portion of each rod member for adjustably securing the corresponding rod member in said fixed portion, whereby said rod members can be adjusted in said fixed portion for adjusting the space between said projecting portions and said flanges for adjusting the force of said return springs on said brake piston.

* * * * *